United States Patent [19]

Organ

[11] Patent Number: 5,002,165

[45] Date of Patent: Mar. 26, 1991

[54] SEALING RING

[75] Inventor: Alan H. Organ, Cheltenham, United Kingdom

[73] Assignee: Samuel Heath & Sons PLC, Birmingham, England

[21] Appl. No.: 325,097

[22] PCT Filed: Sept. 12, 1986
PCT No.: PCT/GB86/00542
§ 371 Date: Jul. 1, 1987
§ 102(e) Date: Jul. 1, 1987

Related U.S. Application Data

[63] Continuation of Ser. No. 61,279, Jul. 1, 1987, abandoned.

[30] Foreign Application Priority Data

Sep. 13, 1985 [GB] United Kingdom ............... 8522665

[51] Int. Cl.$^5$ ..................... F16F 9/36; F16J 9/12; F16J 9/24
[52] U.S. Cl. ........................ 188/282; 16/49; 92/172; 188/322.15; 277/207 R
[58] Field of Search ............. 277/207 R, 209, 211, 277/136, 137, 165; 16/49, 66; 92/205, 250, 251, 248, 208, 218, 172; 188/282, 322.15

[56] References Cited

U.S. PATENT DOCUMENTS

| | | |
|---|---|---|
| 878,476 | 2/1908 | Barker .................. 411/160 X |
| 1,721,325 | 7/1929 | Wilson .................. 92/205 |
| 1,773,363 | 8/1930 | Kibele .................. 92/250 X |
| 1,880,115 | 9/1932 | Smith et al. .......... 285/917 |
| 2,069,402 | 2/1937 | Cowlin .................. 411/162 X |
| 2,179,575 | 11/1939 | Hoskins ............... 411/162 |
| 2,191,101 | 2/1940 | Stellin ................. 411/161 |
| 2,731,315 | 1/1956 | Church ................ 92/251 X |
| 2,778,399 | 1/1957 | Mroz ................... 411/161 |
| 2,783,715 | 3/1957 | Kraus .................. 92/205 X |
| 2,953,811 | 9/1960 | Hall ..................... 16/66 |
| 3,026,104 | 3/1962 | Gerth et al. ......... 16/66 X |
| 3,028,620 | 4/1962 | Quinn .................. 16/52 |
| 3,059,269 | 10/1962 | Selinger et al. ..... 16/66 |
| 3,144,256 | 8/1964 | Wright ................ 92/250 X |
| 3,149,848 | 9/1964 | Galloway ............ 277/165 |
| 3,249,961 | 5/1966 | Quinn .................. 16/66 |
| 3,313,380 | 4/1967 | Person ................ 16/66 X |
| 3,396,976 | 8/1969 | Reinhoudt et al. . 277/216 X |
| 3,457,825 | 7/1969 | Caty ................... 411/544 |
| 3,542,377 | 11/1970 | Voitik ................ 277/207 X |
| 3,923,428 | 12/1975 | Clark et al. ........ 92/205 X |
| 4,102,006 | 7/1978 | Jenkins ............... 16/66 X |
| 4,134,438 | 1/1979 | Frieberg et al. .... 411/163 |
| 4,190,111 | 2/1980 | Davis .................. 411/533 X |
| 4,359,230 | 11/1982 | Bruni .................. 277/216 |
| 4,704,058 | 11/1987 | Crunwell ............ 411/162 |
| 4,710,081 | 12/1987 | Overhues ........... 411/161 |

FOREIGN PATENT DOCUMENTS

| | | |
|---|---|---|
| 1031069 | 5/1958 | Fed. Rep. of Germany . |
| 3016231 | 11/1981 | Fed. Rep. of Germany . |
| 8417939 | 9/1984 | Fed. Rep. of Germany . |
| 8526398 | 12/1985 | Fed. Rep. of Germany . |
| 529769 | 12/1921 | France ................ 411/162 |
| 1318994 | 1/1963 | France ................ 215/349 |
| 65210 | 5/1979 | Japan . |
| 5175 | 12/1914 | United Kingdom ........ 277/207 |
| 982219 | 2/1965 | United Kingdom . |
| 2044840 | 10/1980 | United Kingdom . |
| 1586562 | 3/1981 | United Kingdom ........ 411/546 |

Primary Examiner—Allan N. Shoap
Attorney, Agent, or Firm—Banner, Birch, McKie & Beckett

[57] ABSTRACT

A sealing ring (10) includes a plurality of circumferentially spaced axially directed projections (20) on one radial face thereof. In use, the sealing ring is located within a seating groove which is wider than the spacing between the radial faces a (11,12) of the sealing ring, the projections (20) holding the ring against axial movement within the groove while allowing the ring to swell in the axial direction in between the projections so as to maintain the dimensional stability of the outer face (14) of the ring. The sealing ring is particularly useful in uni-directionally operative hydraulic dampers and door closers incorporating such dampers.

13 Claims, 2 Drawing Sheets

SEALING RING

This application is a continuation of application Ser. No. 061,279, filed July 1, 1987, now abandoned.

DESCRIPTION OF THE INVENTION

This invention relates to sealing rings of the kind used to establish a peripheral seal between a piston and a cylinder in which the piston slides. More particularly, the invention is concerned with a sealing ring in or for an hydraulic damper, especially but not exclusively in or for use in a door closer.

Such sealing rings are commonly of circular shape in radial section (i.e. O-rings) but often other sectional shapes are employed. However, it is usual for the axial dimension of the sealing ring to be rather less than the corresponding dimension of the seating groove of the piston in which the ring is located. This enables swelling of the ring which tends to take place on prelonged exposure to hydraulic fluid to be accommodated without radial expansion.

In an hydraulic damper, the use of a sealing ring has a degree of axial clearance in this way can give rise to an undesirable deviation from the intended damping characteristic at the point where the direction of movement of the piston changes. For example, in the context of a door closer, a damper may include a piston which is movable relative to a cylinder in one direction with little resistance as the associated door is opened, whilst a significant resistance is established when the opposite movement occurs, as the door moves towards its closed position under the influence of spring or other actuating means. Movement of the sealing ring axially in its seating groove at the beginning of such closure movement, whilst only slight, nevertheless allows the door initially to move without any damping through a distance which at the free edge may amount to several centimeters. During such movement, the door gathers speed and when the damper becomes effective it can impose a sudden restriciton on the rate of movement, which causes the door to jolt or jerk, thereby setting up undesirable strain in the hinges, the closer, and the door itself.

It is one of the objects of the invention to provide a novel seal which can be fitted into its seating groove without axial play, so as to enable a damper to be substantially free from such initial undamped movement.

According to one aspect of the invention we provide a sealing ring which affords axially directed projections on one radial face at circumferentially spaced positions.

According to a further aspect of the invention we provide a piston and cylinder assembly including a sealing ring located in a seating groove wherein the sealing ring affords axially spaced radial faces which are spaced apart by a distance less than the axial width of the seating groove and a plurality of axially directed projections on one of said faces at circumferentially spaced positions so that the ring is held against axial movement within the groove.

The projections may be of circular shape in transverse section and preferably of generally conical form.

The radial faces of the sealing ring are preferably flat (apart from the projections) and the inner face is preferably of cylindrical form, with the inner face and each radial face meeting substantially at right angles, the groove being of rectangular shape in transverse section.

The outer face of the ring may include a chamfered portion adjacent to one or both radial faces, and a central cylindrical surface. Desirably, the outer diameter of the ring is controlled to a high degee of tolerance and may, for example, be machined to the required diameter.

The invention further resides in an hydraulic damper incorporating such a piston and cylinder assembly, and a door closer incorporating such a damper.

The invention will now be described by way of example with reference to the accompanying drawings wherein.

Figure 1:
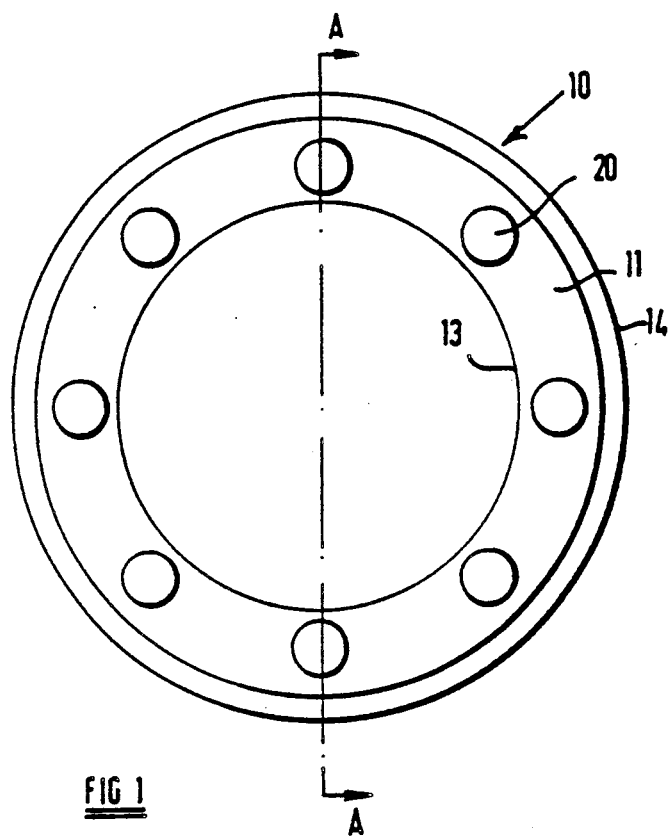
FIG. 1 shows one embodiment of sealing ring in accordance with the invention in end view.
Figure 2:
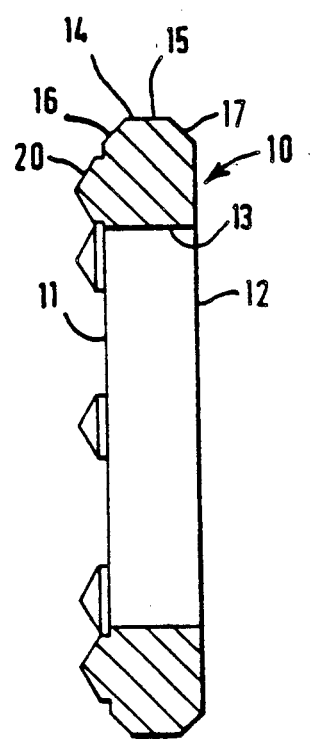
FIG. 2 shows a corresponding diametral section of the sealing ring.

In accordance with the invention a sealing ring 10 is formed with a plurality of circumferentially spaced axially extending projections 20 on one side thereof. As illustrated, there are eight equally spaced projections of circular shape in transverse section, each of substantially conical form on one otherwise flat radial face 11 of the ring. As can be seen from FIG. 1 only a small part of the total area of the face 11 is occupied by the projections 20, which serve as spacers without significantly reducing the ability of the ring to swell in the axial direction in the spaces between the projections.

The other radial face 12 is likewise of flat form, and the inner face 13 is of cylindrical form so as to meet the radial faces 11 and 12 substantially at a right angle. The outer face 14 of the ring includes a central, cylindrical portion 15 and chamfered portions 16 and 17 adjacent to the radial faces.

The sealing ring 10 nay be formed as a moulding of a suitable synthetic rubber, such as a nitrile rubber, but the outer surface may be ground down or otherwise machined so that the external diameter is maintained in production to a high tolerance.

In use, the ring is fitted into a rectangular section seating groove having as axial width such that the ring is received as a tight fit without axial movment. Thus, the projections 20 engage one side wall of the groove whilst the opposite radial face 12 engages the other side wall. The inner surface 13 of the ring seats against the bottom wall of the groove, and the outer surface 14 projects beyond the piston to the extent required to estavlish an effective seal with the interior surface of the cylinder within which the piston slids.

Figure 3:
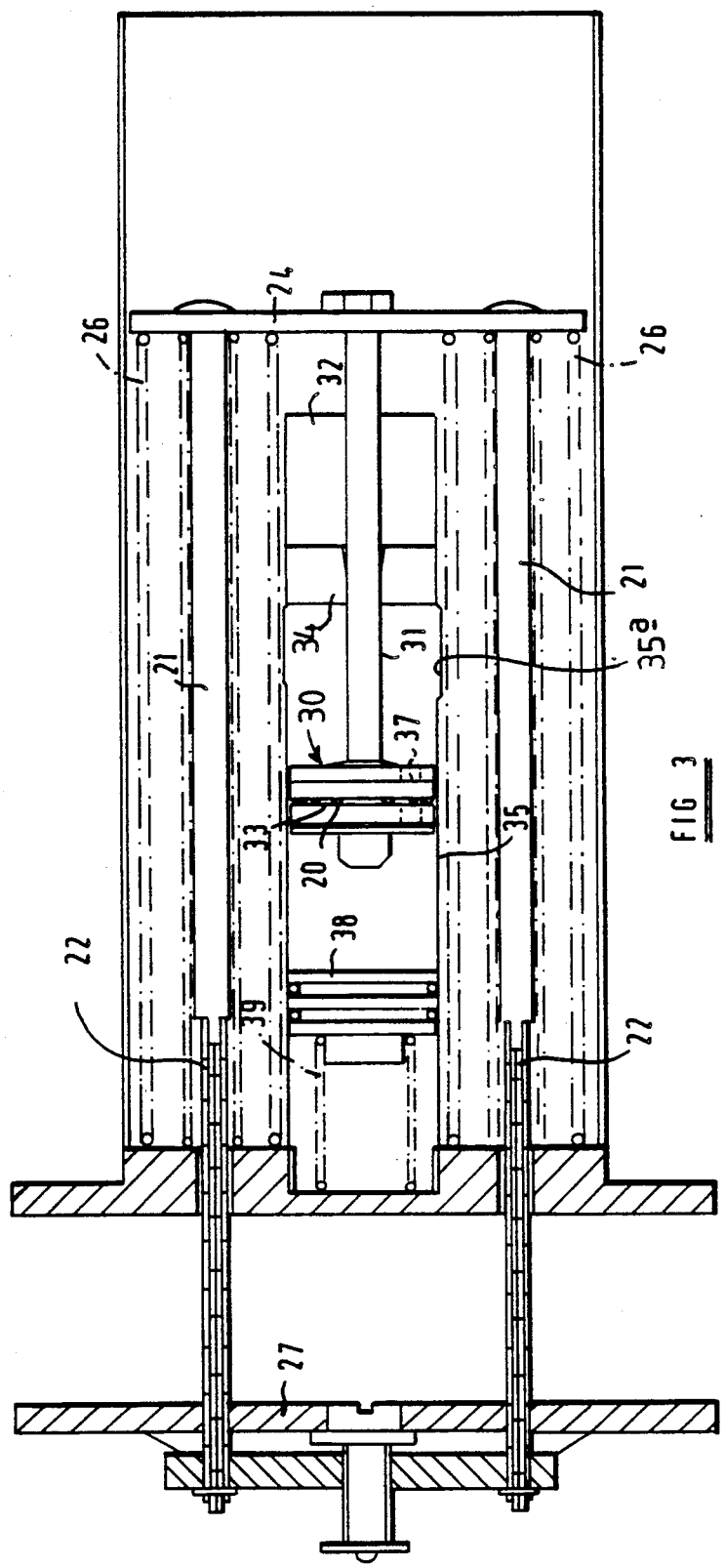
FIG. 3 shows a transverse section through one embodiment of door closer incorporating a hydraulic damper which utilises such a sealing ring.

FIG. 3 shows a door closer of the general type described in British Patent Specification No. 2044840. A closer, as more fully described in said specification, includes a slidable cross-head 24 which is engaged by compression springs 26 to draw shafts 21 and chains 22 inwardly of the housing. The chains 22 are attached at their outer ends to an anchor plate 27 which, in use, is secured to the door frame, the closer itself being mounted within the thickness of the door. Movement of the cross-head 24 by the springs 22 in the door-closing direction is controlled by an hydraulic damper which includes a piston 30 on a piston rod 31 carried by the cross-head.

A sealing ring 10 in accordance with the invention is located in a groove 33 formed in the piston 30, which is slidable within a cylinder formed in the illustrated embodiment as a bore 35 in the housing of the door closer.

The bore 35 houses a bushing 35 which guides the piston 31, and a gland 34 which sealingly engages both the piston rod 31 and the internal surface of the bore 35. At the end of the bore 35 opposite to the bushing 32, a free piston 38 is provided, and a compression spring 39 acts between the piston 38 and the end of the housing to urge the free piston 38 inwardly along the bore 35.

The piston 30 divides the space within the bore between the free piston 38 and the gland 34 into two compartments, such space being filled with hydraulic fluid. A valve, indicated diagrammatically at 37, in known manner allows fluid within the bore to flow relatively freely between the two compartments in one direction whilst imposing a significant restriction to flow in the opposite direction. The piston and cylinder assembly thus provides a uni-directionally operative damper which controls the operation of the door closer.

It will therefore be seen that as the piston 30 reverses its direction of movement within the cylinder, the sealing ring 20 has no freedom to move axially, and accordingly movement of the piston is at all times controlled in accordance with the desired characteristic of the damper.

In particular, since the damper is uni-directionally operative, the required damping characteristic is imposed immediately the piston commences to move in the appropriate direction and especially when the direction of movement changes.

The gaps between the projections 20 allow the ring 10 to swell axially at intermediate positions and in this way, any tendency of the ring to swell radially is eliminated, so that the resistance to movement of the piston afforded by contact between the sealing ring and the cylinder is maintained substantially constant despite ageing of the ring over an extended period of use.

Maintenance of an accurate external diameter for the sealing ring is particularly important where the damper is of a type which allows for undamped movement if the piston at one end of its stroke by means of a widened end portion of the cylinder as shown at 35a in FIG. 3. Spring actuated closure of a door is controlled by means of the hydraulic damper. Portion 35a of the bore 35 is of somewhat increased internal diameter so as to allow hydraulic fluid to flow freely past the outer face of the piston 30 as the associated door finally moves into its position of closure, thereby enabling the door to accelerate and overcome the frictional resistance of any latch or lock which might otherwise prevent the door closing fully.

To enable such final acceleration to be achieved reliably over an extended period of use, it is essential that the external diameter of the sealing ring 10 which is carried by the piston 30 is maintained constant during the working life of the damper. Any increase in the external diameter of the sealing ring will impose an undesired restriction on the flow of fluid past the outer face of the ring at the widened portion of the cylinder so that the effectiveness of the final closing action will be reduced.

The chamfered portions 16 and 17 of the ring 10 serve to minimise damage to the sealing ring as it passes repeatedly over the junction between the main portion of the bore 35 in which the central portion 15 of the outer face of the piston engages the interior of the cylinder sealingly and the widened portion 35a of which affords a radial clearance relative to the central portion 15 of the outer face.

The generally rectangular section of the sealing ring serves to ensure that it cannot twist within the seating groove 33.

Where the seal 10 is used in a uni-directional hydraulic damper, as for shown in FIG. 3, the projections 20 preferably face towards the higher pressure side of the piston 31, so that the prevailing pressure which is exerted on the piston tends to force the radial face 12, which is not provided with projections against the corresponding side wall of the seating groove.

By forming the projections of substantially conical shape, rather than for example cylindrical, the volume availble for axial swelling of the ring is maximised.

The features disclosed in the foregoing description, or the accompanying drawing, expressed in their specific forms or in terms of a means for performing the disclosed function, or a method or process for attaining the disclosed result, may, separately or in any combination of such features, be utilised for realising the invention in diverse forms thereof.

I claim:

1. A unidirectional hydraulic damper comprising a piston and cylinder assembly having valve means permitting substantially unrestricted flow of hydraulic fluid therethrough in one direction and a restriced flow of hydraulic fluid therethrough in the opposite direction in which said piston and cylinder assembly comprises:
   a cylinder having an interior surface;
   a piston slidably received in said cylinder and having formed therein a seating groove in its outer periphery; and
   a sealing ring in said seating groove, reciprocating with said piston and including:
      axially spaced first and second radially extending side faces which are spaced apart by a distance less than an axial width of said seating groove; and
      an outer face having a diameter which projects beyond said piston to the extent required to establish an effective reciprocating seal between said ring and said interior surface of said cylinder within which said piston slides;
   a plurality of axially directed projections of generally conical form provided on only one of said radially extending side faces so that said ring is substantially held against axial movement within said seating groove but permits axial expansion within said seating groove.

2. A unidirectional hydraulic damper as in claim 1 wherein, said projections are disposed on only a small portion of total surface area of said one radially extending side face having projections.

3. A unidirectional hydraulic damper as in claim 1, wherein a transverse section of each of said plurality of projections are of a substantially circular shape.

4. A unidirectional hydraulic damper as in claim 1, wherein both of said radially extending side faces have substantially flat portions.

5. A unidirectional hydraulic damper, as in claim 1, further comprising an inner surface disposed between inner peripheral ends of both of said radially extending said faces at substantially right angles to both of said radially extending side faces and defining an inner substantially cylindrical surface of said ring.

6. A unidirectional hydraulic damper as in claim 1, said outer face including:
   a first outer surface defining a first portion of an outer substantially frusto-conical face of said ring; and a second outer surface defining a second portion of an outer substantially frusto-conical face of said ring and a radial distance from a centerline of said ring to said second outer surface is less than a radial distance from the centerline of said ring to said first outer surface.

7. A unidirectional hydraulic damper as in claim 6, wherein said first outer surface defines a central surface;

said second outer surface is disposed between said central surface and an outer end of one of said radially extending side faces and defines a chamfer; and further comprising a third outer surface defining a third portion of an outer substantially frusto-conical surface of said ring, said third outer surface is disposed between said central surface and an outer end of the other of said radially extending side faces and defines a second chamfer, and a radial distance from the centerline of said ring to said outer third surface is less than the radial distance from the centerline of said ring to said central surface.

8. A unidirectional hydraulic damper as in claim 7, wherein said central surface lies in a plane at approximately 90° to both of said radially extending side faces.

9. A unidirectional hydraulic damper as in claim 7, wherein said central surface of said outer face of said ring is machined to the required diameter.

10. A unidirectional hydraulic damper as in claim 1, wherein said projections are at circumferentially spaced positions along said one radially extending face having projections.

11. A unidirectional hydraulic damper as in claim 1, wherein the piston is axially disposed in said cylinder;

said seating groove further comprises a bottom wall; and said sealing ring further comprises an inner surface disposed between inner ends of both said radially extending faces at substantially right angles to both of said radially extending side faces and seated against said bottom wall of said seating groove.

12. A unidirectional hydraulic damper as in claim 11, wherein said sealing ring further comprises an outer peripheral surface disposed between outer ends of both of said radially extending side faces and at least partially disposed against an interior wall of said cylinder.

13. A undirectional hydraulic damper according to claim 1 in which the cylinder has one end portion of a larger diameter than the diameter of the other end portion of the cylinder, a rod of the piston being slidably received within said cylinder at the larger diameter end portion of the cylinder.

* * * * *